Sept. 18, 1956          A. C. McKINNIS          2,763,532
PROCESS FOR HYDROGEN CYANIDE PRODUCTION
Filed Dec. 18, 1950                                    3 Sheets-Sheet 1
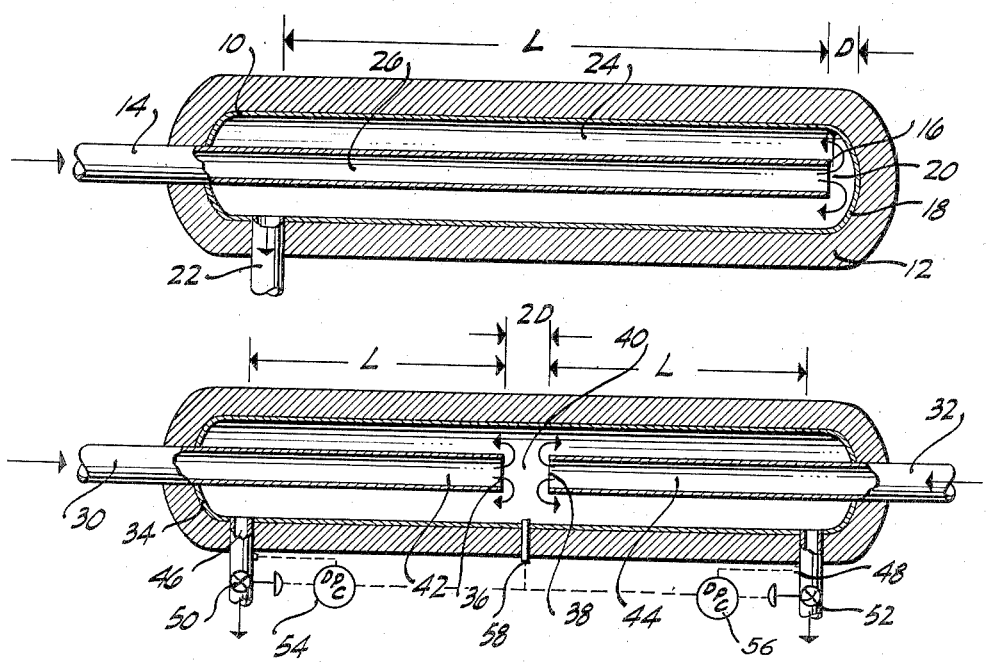
FIG. 1.
FIG. 2.
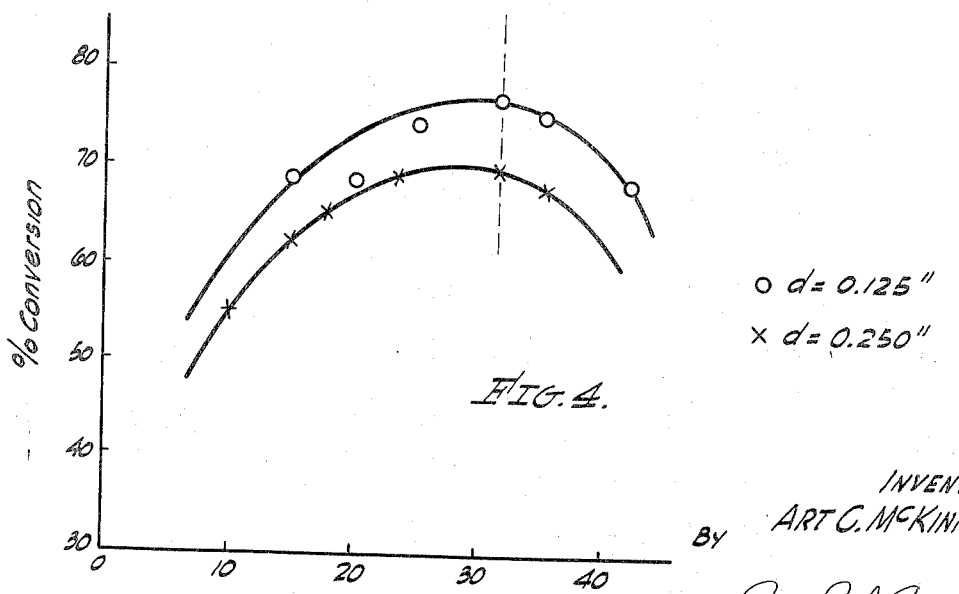
FIG. 4.
○ d = 0.125"
× d = 0.250"
Preheat length L in tube diameters d
INVENTOR.
ART C. McKINNIS,
BY
AGENT.

Sept. 18, 1956  A. C. McKINNIS  2,763,532
PROCESS FOR HYDROGEN CYANIDE PRODUCTION
Filed Dec. 18, 1950  3 Sheets-Sheet 2
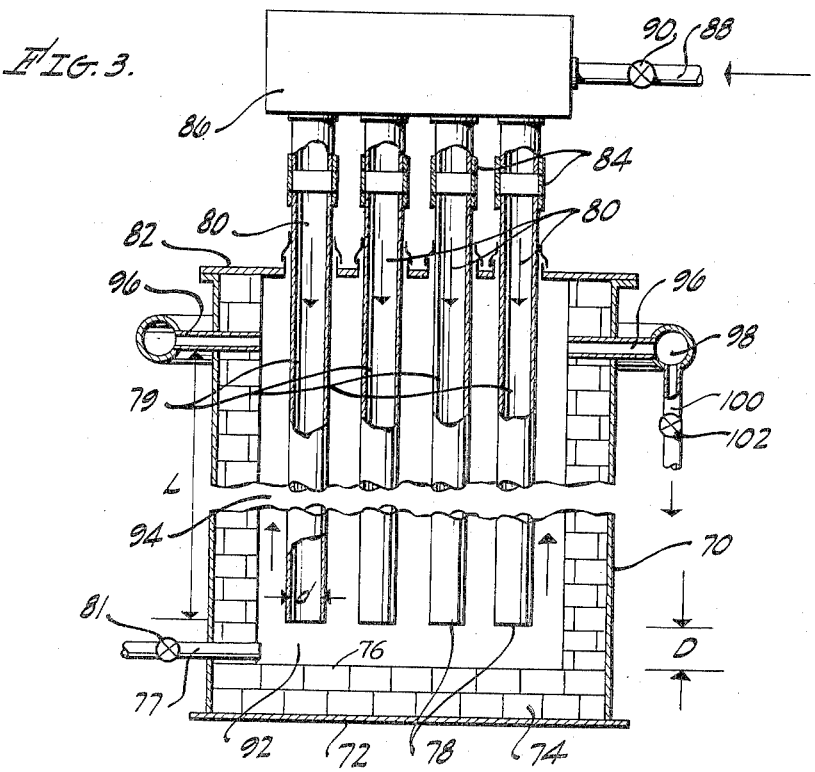
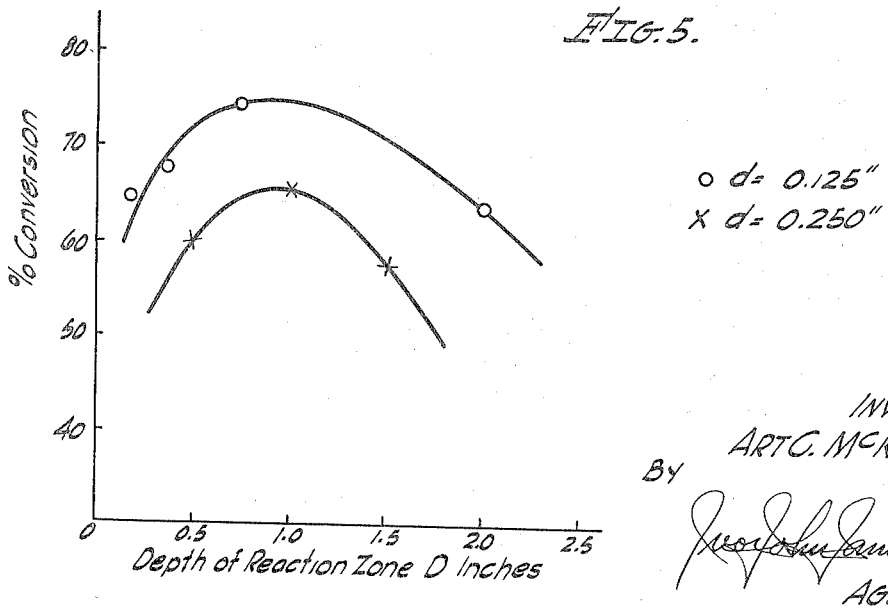
INVENTOR.
ART C. McKINNIS,
BY
AGENT.

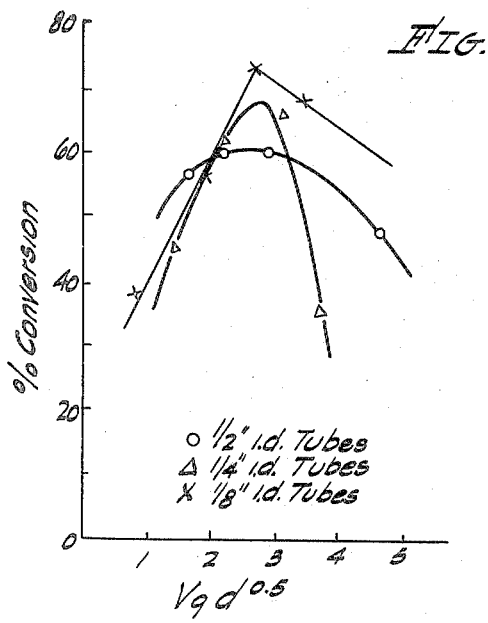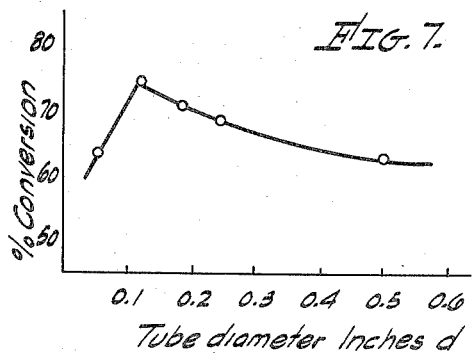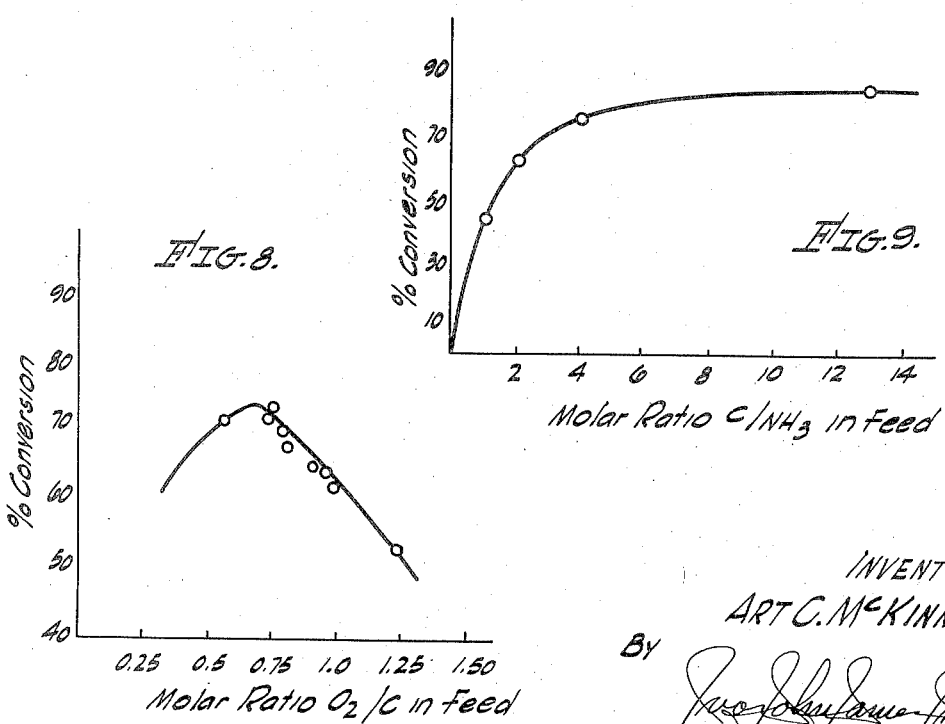

United States Patent Office 2,763,532
Patented Sept. 18, 1956

2,763,532

PROCESS FOR HYDROGEN CYANIDE PRODUCTION

Art C. McKinnis, Long Beach, Calif., assignor to Union Oil Company of California, Los Angeles, Calif., a corporation of California Application December 18, 1950, Serial No. 201,332

10 Claims. (Cl. 23—151)

This invention relates to high temperature gaseous reactions and in particular relates to a process and apparatus for the production of hydrogen cyanide by the reaction of a gaseous mixture containing oxygen, ammonia and a hydrocarbon.

Hydrogen cyanide is commercially produced in large quantities, much of it by a platinum catalyzed reaction at high temperatures of a highly purified mixture of oxygen, methane and ammonia. There are certain disadvantages characteristic of such a catalytic process, among them being the expense of the catalyst initially and the continued cost of catalyst replacement necessitated by catalyst losses. Additionally platinum catalysts are highly sensitive to poisoning due to certain specific compounds and consequently the gaseous mixture must be highly purified in order to prevent catalyst poisoning.

It has been also proposed to prepare hydrogen cyanide noncatalytically from substantially the same gaseous constituents through the mechanism of high temperature partial oxidation. In these processes the reactant gases are heated to temperatures approximating 1000° C. and pass through a reaction space for periods of time ranging from 0.72 to as high as 10 or 12 seconds (gaseous hourly space velocities of between 300 to 5000). Certain disadvantages are characteristic of such a thermal process including the requirement of relatively large reactors to furnish the necessary reaction space, and very poor heat efficiency.

It is therefore a primary object of this invention to provide an improved process for the conversion of ammonia into hydrogen cyanide through partial oxidation, which process is characterized by a markedly improved heat efficiency and an increased hydrogen cyanide yield.

Another object of this invention is to provide in a partial oxidation process for hydrogen cyanide production specific procedures for handling the flow of the reacting gases which result in improved yield and high heat economy.

It is a further object of this invention to provide a partial oxidation process for hydrogen cyanide production in which the flow direction of the reacting gases is reversed during reaction and cooled, first in direct contact and subsequently in indirect contact and in heat exchange relationship with the reactant gases.

Another object of this invention is to control closely the turbulence of the gases during reaction within close critical limits whereby a maximum conversion is obtained and at the same time a minimum of added heat is required in the process.

It is a further object of the present invention to provide a particularly well suited apparatus of unique design to accomplish the aforementioned objects and in which close physical tolerances are observed to raise the over-all process efficiency to a maximum.

Other objects and advantages of this invention will become apparent to those skilled in the art as the description thereof proceeds.

Briefly, the present invention comprises an improved noncatalytic partial oxidation process for the conversion of a gaseous mixture containing oxygen, ammonia, and a hydrocarbon into hydrogen cyanide in which the flow of the reacting gases is reversed under conditions of carefully controlled flow whereby a maximum ammonia to hydrogen cyanide conversion is obtained simultaneously with a highly efficient transfer of thermal energy from the product to reactant gases.

It has been found that in the reaction of ammonia and methane in the presence of oxygen to produce hydrogen cyanide that conversions of the order of from 60% to 80% based on the ammonia introduced can be expected and at the same time render the process autothermic, that is, no extraneous heat need be added in the process of this invention. It has further been found that the beneficial effect on the conversion of the presence of hydrogen during the reaction is obtained without the addition of a stream of hydrogen to the reaction by reversing the flow of reactant gases issuing from an orifice so that the product gases produced in the reaction flame surround the reacting flame. The distance through which the reactant gases pass during reaction is kept very short, on the order of one inch. Thus the reacting gases, taking the form of a flame, are discharged into a confined space under such controlled conditions that the product gases surround the flame while progressing in the opposite direction.

By controlling the flow rates of the reactant gases within close limits a highly efficient direct heat transfer from the product gases to the reacting gases in the flame is obtainable with substantially no mixing of the product gases with the reacting gases as to result in decomposition of the desired product in the flame. By employing a reactant gas flow rate which is too low, the products of reaction remain at the high temperature of the flame too long and a low ammonia to hydrogen cyanide conversion is obtained. By employing gas flow rates which are excessively high, undesirable turbulent mixing of product gases with the reactant gases occurs also giving an undesirably low conversion. However, by controlling the reactant or feed gas flow rate to within narrow limits, which are also dependent upon the cross sectional area of the orifice through which the reactant gases are introduced into the reacting flame, a highly efficient conversion to hydrogen cyanide is obtained simultaneously with an apparent hydrogen injection from the product gases directly into the flame and with a direct and indirect heat exchange between the product and the reactant gases which renders the process autothermic.

The limitations placed on the process operating variables will be more specifically defined below and a better understanding of the steps involved in the process and the apparatus provided to accomplish the objects of the present invention will be had by reference to the accompanying drawings in which:

Figure 1 is a cross section view of a simple modification of the apparatus of the present invention, Figure 2 is a modification of the apparatus shown in Figure 1, Figure 3 is an elevation view in cross section of an apparatus capable of producing hydrogen cyanide in commercial quantities, Figure 4 is a plot of experimental data showing the critical effect upon ammonia conversion of the length of the reactant gas preheating zone, Figure 5 shows a plot of experimental data indicating the effect on the depth of the confined reaction zone on the ammonia conversion.

Figure 6 is a plot of experimental data showing the correlation of the conversion of ammonia with variation in the reactant gas velocity and the diameter of the orifice through which the reactant gases are introduced, Figure 7 is a plot of experimental data showing the critical effect upon ammonia conversion of the diameter of the feed gas orifice, Figure 8 is a plot of experimental data showing the critical variation in ammonia conversion of variation in the molar ratio of oxygen to carbon in the reactant gas feed, and Figure 9 is a plot of experimental data showing the effect upon conversion of variations in the molar ratio of carbon to ammonia in the reactant gas feed.

Referring now more particularly to Figure 1, an elongated reaction vessel 10 is shown surrounded by insulating layer 12 and provided with a concentric reactant or feed gas inlet tube 14. Tube 14 extends concentrically through vessel 10 and terminates in an orifice or outlet opening 16 immediately adjacent the end 18 of vessel 10. The space between the plane of orifice 16 and wall 18 is the reaction zone in which the flame of reacting gases is maintained. The depth D of the reaction zone is equal to the distance between orifice 16 and wall 18. The length L of inlet tube 14 is the reactant gas preheating zone in which indirect heat exchange between the product gases and the entering reactant gases occurs. Outlet conduit 22 is provided near the opposite end of vessel 10 from the reaction zone for removing cooled products of the conversion.

Thus, in the process of the present invention, as carried out in the reactor described above, cool reactant gases are passed via tube 14 through preheating zone 26 and are discharged into reaction zone 20 through orifice 16. The product gases of the reaction reverse flow direction and pass back through the annular space 24 surrounding tube 14. In this reversal, direct heat exchange between product gases and reacting gases takes place as well as a probable hydrogen injection in reaction zone 20. During passage through the annular product cooling zone 24 an indirect heat exchange between product gases and the entering reactant gases in preheat zone 26 takes place. In this manner the reactant gases are preheated in indirect heat exchange relation with the product gases while the latter are cooled. It has been found that the process may be made autothermic and preheated reactant gases need not be introduced into the reactor to sustain the reaction. It is found that the hydrogen cyanide conversions are as high or higher than those previously experienced when direct hydrogen addition to the reaction was employed. It is therefore believed that due to the high motility of hydrogen molecules that there may well be a direct exchange of hydrogen from the product gases to the reacting gases during the reversal of flow in reaction zone 20.

Referring now more particularly to Figure 2, a second modification of an apparatus of the present invention is shown in which reactant gas inlet tubes 30 and 32 are introduced through opposite ends of reaction vessel 34 and terminated in orifices 36 and 38 respectively in an inner portion of vessel 34. The distance separating orifices 36 and 38 is equal to twice the depth D of the reaction zone. Thus a dual reaction zone 40 is provided between orifices 36 and 38. Lengths L of reactant gas inlet tubes 30 and 32 are indicated respectively by numerals 42 and 44 and comprise feed gas preheat zones. Product gas outlets 46 and 48 respectively controlled by valves 50 and 52 are provided at opposite ends of reaction vessel 34. Valves 50 and 52 are actuated by differential pressure controllers 54 and 56 to equalize product gas flow rate through both halves of the reaction vessel by varying the effluent gas rate in accordance with the differential pressure existing across each half of the reaction vessel between intermediate point 58 and the outlet lines 46 and 48.

Thus, in the apparatus of Figure 2, diametrically opposed flows of reactant gas are introduced via opposed feed inlet tubes discharging toward each other into a confined reaction zone. The product gases from the reaction zone are reversed in direction and flow in the opposite direction surrounding the feed inlet tube. The product and reactant gases are thus brought first into direct and subsequently into indirect heat exchange relation. The process as carried out in both reactors shown in Figures 1 and 2 is autothermic and the ammonia conversion efficiency is of the order of 65–85% by careful selection of the value of feed inlet tube cross sectional area or diameter $d$, the preheat length L of the feed inlet tubes, and the depth D of the reaction zone.

Referring now more particularly to Figure 3 an elevation view in cross section is shown of a larger commercial scale apparatus for the conversion of ammonia to hydrogen cyanide. A plurality of feed inlet tubes for reactant gas in parallel is employed to increase the capacity for hydrogen cyanide production. The apparatus comprises a metallic shell 70 which may be of cylindrical or rectangular shape provided with a bottom closure 72 and lined with refractory lining 74. A substantially flat floor 76 is provided opposite which the outlet orifices 78 of the plurality of reactant gas inlet and preheating tubes 80 are positioned. Shell 70 is provided with top closure 82 through which the reactant gas inlet tubes 80 are passed and sealed. Tubes 80 are connected by means of connectors 84 to reactant gas distributor or header 86. Line 77 controlled by valve 81 is provided for inserting a torch and lighting the reaction flame in zone 92.

The reactant gas mixture is introduced via line 88 at a rate controlled by valve 90 into distributor box 86. The reactant gas mixture is equally divided in quantity among the plurality of feed inlet tubes and passed into the reaction vessel proper. During passage of the reactant gases through the preheating zone 79 (length L of tubes 80) indirect heat exchange occurs with the product gases flowing in the opposite direction around tubes 80 through cooling zone 94. The preheated reactant gases are discharged from orifices 78 into reaction zone 92 having depth D. The gas flow then reverses direction and passes from reaction zone 92 through cooling zone 94 surrounding tubes 80. The product gas is removed from a plurality of points spaced around the upper end of vessel 70 via lines 96 communicating with product outlet header 98. The cool product gas is subsequently withdrawn therefrom via line 100 at a rate controlled by valve 102.

In the apparatus just described in connection with Figure 3 and in the apparatuses of Figures 1 and 2 it has been found to be essential to maintain carefully preheating length L, reactant gas inlet tube diameter $d$, the reactant gas velocity through the preheating tubes, and the reaction zone depth D within close limits to achieve the most desirable results from the process and apparatus of the present invention. Thus to obtain maximum conversion to hydrogen cyanide the design variables L, D, and $d$ are kept constant at optimum values subsequently defined as is the reactant gas velocity and a greater or smaller production capacity for hydrogen cyanide is obtained by employing a greater or smaller number of reactant feed tubes in parallel.

Referring now more particularly to Figure 4, the results of experimental data are shown indicating the variation in ammonia conversion to hydrogen cyanide as the preheat length L of the feed inlet tubes is changed. In the figure there are two curves shown, one for reactors provided with feed gas inlet tubes of 0.125 inch in diameter and one for tubes of 0.250 inch inside diameter. The flow rate of gas through each of these tubes is maintained at an optimum previously determined, the reaction temperature was an average of 2500° F. and the gas composition averaged 1 part of ammonia, 4 parts of natural gas, and 15 parts of air by volume. From these data it is indicated that the preheat length L has a marked effect upon the efficiency of ammonia conversion and that in the apparatus the preheat length L should be from 10 to 45 tube diameters $d$ and preferably between about 25 and 35 tube diameters. Thus as larger diameter feed inlet tubes are used correspondingly longer lengths are to be employed to obtain optimum conversion.

Referring now more particularly to Figure 5 the results of experimental data are shown plotted indicating the variation in conversion of ammonia to hydrogen cyanide in reactors having 0.125 inch tubes and 0.250 inch tubes as the depth D of the reaction zone is varied. Both of these curves indicate that the depth of the reaction zone has a marked effect upon the ammonia conversion, that for good results a reaction zone depth of between about 0.1 and 2.0 inches should be used and that preferably a depth of between 0.5 inch and 1.5 inches be used, while for the apparatus of Figure 2 the opposing tube orifices are separated by between 0.2 and 4.0 inches and preferably between 1.0 and 3.0 inches. It is also indicated that a higher conversion, 75% compared to 65%, is obtainable with 0.125 inch tubes than with 0.250 inch tubes. These data are characteristic of reverse flow reactors according to this invention operating at about 2500° F. reaction zone temperature and at an optimum flow rate subsequently described for the particular tube diameter shown. The composition of the feed gas was substantially the same as given in connection with Figure 4.

Referring now more particularly to Figure 6 experimental data are shown plotted indicating the variation in the conversion of ammonia to hydrogen cyanide as a function of the feed gas velocity through the feed inlet tubes and the diameter of the feed gas tubes. The data were obtained under substantially the same conditions as the data described in Figures 4 and 5 and are shown for reactor tubes of 0.125 inch, 0.250 inch and 0.50 inch inside diameter. The results obtained are plotted as a function of what is designated as a flow rate factor which is equal to $$V_g d^{0.5}$$

wherein $V_g$ is the calculated gas velocity in the feed tubes in feet per second at standard conditions of temperatures and pressure and $d$ is the inside diameter of the feed tubes in inches. It has been found that as larger diameter tubes are employed the permissible gas velocity in any of the tubes decreases for a maximum ammonia conversion. The data here show that a flow rate factor of between about 1.5 and about 4.0 will give good conversions and that preferably a flow rate factor of about 2.0 to 3.5 be maintained but with an optimum value of about 2.8. It is to be noted that with 0.5 inch diameter tubes a flow rate factor of between about 1 and about 5 results in conversions above about 45%. The experimental data thus shown indicate that a definite interrelation of gas velocity in the reactor and the inside tube diameter exists which effects the ammonia conversion to hydrogen cyanide. It is believed that this factor is a direct measure of the gas flow characteristics maintained within the reaction zone and that the data for factors above about 4, particularly with tubes of 0.125 and 0.250 inch in diameter, indicate more turbulent reaction flame conditions resulting in the mixture of product and reactant gases in the reaction zone and a consequential destruction of hydrogen cyanide. The data for flow rate factors maintained below about 1 indicate that the time which the product gas remains at high temperatures is excessive and that the hydrogen cyanide product is thermally decomposed by this means. However, this hypothesis has not yet been positively established, but the data indicate the existence of this or a similar relationship.

Therefore, to secure the optimum results the flow rate factor $V_g d^{0.5}$ is to be maintained between the preferred limits given above. It is also to be noted in Figure 6 that successively higher maximum conversions are obtained as the tube diameter decreases.

Referring now more particularly to Figure 7, the direct effect of tube diameter on the ammonia conversion is indicated. Again the experimental data shown are optimum conversions for each tube diameter listed. It is indicated that maximum conversions occur with tube diameters between about 0.05 and 0.5 inch inside diameter and that preferably the inside diameter should be maintained between about 0.075 inch and about 0.25 inch for best results.

Referring now more particularly to Figure 8 experimental data are shown indicating the variation in conversion to hydrogen cyanide as the molar ratio of oxygen to carbon in the reactant gas mixture is varied. The data indicate that maximum conversions are obtained when molar ratios of between about 0.3 and 1.0 mols of oxygen per mol of carbon are employed and that preferably ratios of between 0.5 and 0.9 should be used. Very good results have been obtained in a large number of experimental runs using ratios of from 0.75 to 0.80 mol of oxygen per mol of carbon in the hydrocarbon gas.

Referring now more particularly to Figure 9 the conversion to hydrogen cyanide is shown to be variable with the molar ratio of carbon to ammonia in the reactant gas mixture. As would be expected a higher degree of conversion is obtained when high carbon to ammonia ratios are employed. Preferably, however, from economic considerations carbon to ammonia ratios in excess of about 8 or below about 1 are not desirable. Preferably this ratio is maintained between about 2 and about 6 and very satisfactory conversions are obtained at a ratio of 4.0.

From a consideration of the data given in the preceding two examples it is indicated that a feed gas composition containing oxygen, ammonia, and a hydrocarbon preferably is of a composition having about 0.75 mol of oxygen per mol of carbon and about 4 mols of carbon per mol of ammonia.

The oxygen-containing gases incorporated in the feed gases suitable for producing hydrogen cyanide according to this invention include atmospheric air, oxygen-enriched air, or commercial oxygen. The experimental data given in Figures 4 through 9 are representative of the conversions obtained using air as the oxidizing agent. When oxygen-enriched air is employed, similar degrees of conversion are obtained. When using oxygen as the oxidizing agent the feed gas and the product gas of course are uncontaminated with atmospheric nitrogen and the conversions are about the same. There is no particular need for high purity air or high purity oxygen which is a primary object of the process.

The hydrocarbon fraction of the reactant gas mixture is preferably a nonaromatic hydrocarbon, that is, either an aliphatic or naphthenic vaporizable hydrocarbon having a boiling point not exceeding about 600° F. Preferably normally gaseous hydrocarbons are employed such as methane or natural gas since both of these are readily available. However, other hydrocarbons or mixtures thereof, especially the normally gaseous hydrocarbons having 1 to 4 carbon atoms per molecule are well suited for conversions to hydrogen cyanide. Saturated or unsaturated aliphatic or naphthenic hydrocarbons may be employed such as ethylene, acetylene, propylene, the unsaturated butenes as well as ethane, propane, and the saturated butanes. If desired normally liquid hydrocarbons such as gasoline, naphthas, kerosene, and similar products may be vaporized and substituted as the hydrocarbon fraction in the reactant gas retaining the oxygen to carbon and carbon to nitrogen ratios given.

In the construction of the reactors of the present invention it has been found desirable to employ certain specific ratios of cross sectional area open to product gas flow around the feed tubes in the product gas cooling zone to the cross sectional area to the reactant gas flow through the preheating zone. This ratio is preferably between about 2 and about 6 for optimum results as determined by variation in ammonia conversion.

The reaction time that the reactant gases exist in the reaction zone after leaving the feed tube orifices and prior to entering the product gas cooling zone around the feed tubes is, in the process of this invention, between about 0.02 and about 0.06 second. The short contact times permissible while realizing the high ammonia conversions of this invention are believed to be attributable to reversal of flow in the reaction zone under such conditions that hydrogen injection directly from the product gases to the reacting gases may be obtained. This has not, however, been completely established.

The arrangement of the plurality of feed tubes is preferably any regular geometric spacing. Triangular or square tube arrangements or spacings may be used. By restricting the area open to gas flow outside the tubes to between 2 and 6 times that open to gas flow inside the tubes an optimum is obtained in which good heat transfer is realized with a minimum amount of turbulence.

Although the apparatus of the present invention, particularly the one described in Figure 3, is indicated with vertical tubes which is preferable, a plurality of parallel reaction tubes may be employed disposed horizontally as indicated in Figures 1 and 2 or in any other direction required by circumstances. Similarly a reactor containing a plurality of tubes may be made utilizing the principle shown in Figure 2 in which the feed tubes project inwardly from opposite ends from an elongated reaction vessel with the orifices of corresponding tubes spaced directly opposite to each other.

Temperature exploration of the reaction space and of the product gas cooling zone surrounding the tubes indicate that these temperatures are all well below the average reaction zone temperature of 2500° F. The temperature of the orifices of the feed inlet tubes is between about 1200° F. and 2250° F. The reactant gases are preheated to a temperature between about 1000° F. and 2000° F. in the preheating zone with temperatures between about 1200° and 1600° F. being preferred. The reaction temperature under these conditions is usually between 2000° and 3000° F. Consequently the materials which may be used to construct the apparatus of the present invention need not be high temperature refractories. It has been found that no chemical influence due to the materials of construction is observed on the reaction. The tubes therefore may be quartz, silimanite, mullite, or other refractory material.

The pressure at which ammonia conversion according to this invention is carried out is preferably at or about atmospheric pressure since it has been found that the effect of pressure is quite small. However, pressure from subatmospheric to superatmospheric such as from 5 to 50 pounds per square inch absolute may be employed without departing from the principle of the present invention.

*Example*

In a multitube reactor similar to that shown in Figure 3 and provided with 16–0.5 inch diameter quartz feed tubes arranged in four banks of four each, a conversion of ammonia to hydrogen cyanide was carried out. The feed rate was 807.2 standard cubic feet per hour having the following composition:

| Component: | Volume per cent |
|---|---|
| Air | 74.4 |
| Natural gas | 19.8 |
| Ammonia | 5.8 |
| | 100.0 |

The natural gas employed contained 83% methane, 10% ethane and 7% propane and higher molecular weight constituents. The oxygen-to-carbon ratio was 0.79 mol per mol and the carbon-to-ammonia ratio was 3.4 mols per mol. The temperature at the feed tube orifices was 2280° F. and the product gas was removed at 293° F. 16 inches from the feed tube orifices and near the top of the reactor. The product gas had the following composition on a water-free basis:

| Component: | Volume per cent |
|---|---|
| Nitrogen | 61.6 |
| Hydrogen | 18.3 |
| Carbon monoxide | 11.0 |
| Methane | 1.6 |
| Carbon dioxide | 0.8 |
| Argon | 0.7 |
| Acetylene | 0.5 |
| Ethylene | 0.3 |
| Hydrogen cyanide | 3.0 |
| Ammonia | 2.2 |
| | 100.0 |

The conversion of ammonia to hydrogen cyanide was 58%. It is to be noted that the only product of ammonia reaction in the product gas is hydrogen cyanide.

Hydrazine may be employed as the source of nitrogen in the process of this invention while the stated $O_2/C$ and $C/N$ ratios are maintained, but ammonia is preferred.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the conversion of ammonia to hydrogen cyanide which comprises passing a reactant gas mixture of hydrocarbon, oxygen, and ammonia through an elongated preheating zone having an inside diameter between 0.05 and 0.5 inches, introducing preheated reactant gas therefrom into a confined reaction zone, establishing and maintaining a flame reaction therein at the outlet of said preheating zone forming product gases containing hydrogen cyanide, immediately reversing the flow direction of the reacting gases in said confined reaction zone thereby surrounding said flame with a flow of said product gas so as to provide a direct countercurrent heat exchange between said product gas and said reactant gas entering said reaction zone, passing said product gas from said reaction zone through a product cooling zone surrounding said preheating zone in indirect countercurrent heat exchange relation to said reactant gas thereby terminating said flame reaction and forming said preheating reactant gas mixture and cooled product gases, controlling the rate of introduction of said reactant gas mixture into said preheating zone so that the product of the reactant gas velocity in feet per second calculated to standard conditions and the square root of the inside diameter of said preheating zone in inches is between a value of 1.5 and 4.0 to maintain the conversion of ammonia to hydrogen cyanide at a maximum, and removing said cooled product gas containing hydrogen cyanide from said product cooling zone.

2. A process according to claim 1 wherein the molar oxygen to carbon ratio in said reactant gas is maintained between 0.3 and 1.0 and the carbon to nitrogen ratio is maintained between 1.0 and 8.0.

3. A process according to claim 3 wherein said reactant gas mixture comprises a mixture of air, ammonia and natural gas.

4. A process according to claim 1 wherein said hydrocarbon comprises a nonaromatic hydrocarbon boiling below 600° F. atmospheric pressure.

5. A process according to claim 1 wherein said hydrocarbon comprises a normally gaseous aliphatic hydrocarbon.

6. A method according to claim 1 wherein said elongated preheating zone consists of a plurality of narrow elongated parallel preheating zones, in combination with the step of dividing said reactant gas into a plurality of portions for introduction into each of said zones.

7. A process for the conversion of ammonia to hydrogen cyanide which comprises passing a reactant gas mixture of hydrocarbon having an inside diameter between 0.05 and 0.5 inches, oxygen and ammonia through an elongated preheating zone, controlling the rate of flow of said reactant gas mixture through said preheating zone so that the product of the linear reactant gas velocity in feet per second calculated at standard conditions and the square root of the inside diameter in inches of said preheating zone is between 2.0 and 3.5, introducing preheated reactant gas into a confined reaction zone, establishing and maintaining a flame reaction therein at the outlet of said preheating zone forming product gases containing hydrogen cyanide, immediately reversing the flow direction of the reacting gases therein, thereby surrounding said flame with a flow of said product gases and providing a direct countercurrent heat exchange between said product gases and said reactant gas entering said reaction zone, passing gaseous products of relation from said reaction zone through a product cooling zone surrounding said preheating zone in indirect countercurrent heat exchange relation to said reactant gas thereby terminating said flame reaction and forming said preheated reactant gas mixture and cooled product gases and removing said cooled product gases containing hydrogen cyanide from said cooling zone.

8. A process for the conversion of ammonia to hydrogen cyanide which comprises forming a reactant gas mixture of oxygen, ammonia and hydrocarbon, passing said reactant gas through an elongated preheating zone having an inside diameter between 0.05 and 0.5 inches, maintaining a reactant gas flow rate factor $V_g d^{0.5}$ therein of between 1.5 and 4.0, wherein $V_g$ is the reactant gas velocity in feet per second calculated at standard conditions and $d$ is the inside diameter of the preheating zone in inches, passing preheated reactant gas therefrom into a confined reaction zone and immediately reversing the flow direction of the reacting gases therein and passing product gases through a product cooling zone surrounding said preheating zone so as to establish and maintain in said confined reaction zone a flame reaction surrounded by product gases containing hydrogen cyanide and to provide successively a direct interchange of heat from said product gas to said reactant gas entering said reaction zone and then in indirect interchange of heat from said product gas to said reactant gas in said elongated preheating zone, said flame reaction terminating upon passage of product gases therefrom into said product cooling zone to form cool product gases therein, and removing cooled product gases containing hydrogen cyanide from said cooling zone.

9. A process for conversion of ammonia to hydrogen cyanide which comprises mixing atmospheric air, ammonia and a hydrocarbon vapor to form a reactant gas mixture having a molar oxygen to carbon ratio between 0.5 and 0.9 and a molar carbon to nitrogen ratio of between 2.0 and 6.0, passing said reactant gas mixture through an elongated preheating zone having an inside diameter between 0.05 and 0.5 inches, preheating said reactant gas mixture to a temperature between 1200° and 1600° F., maintaining a flow rate factor $V_g d^{0.5}$ therein between 2.0 and 3.5, wherein $V_g$ is the reactant gas velocity therein in feet per second calculated at standard conditions and $d$ is the inside diameter of the preheating zone in inches, discharging preheated reactant gas into a confined reaction zone of restricted depth, immediately reversing the direction of flow of the reaction gases therein, passing product gases from said reaction zone through a product gas cooling zone surrounding and in indirect heat exchange relation to said reactant gas flowing in said preheating zone thereby establishing and maintaining a flame reaction surrounded by hydrogen cyanide-containing product gases within said confined reaction zone so as to provide direct countercurrent heat interchange between said product gases and the reactant gases entering said reaction zone followed by an indirect countercurrent heat interchange between said reactant and product gases which terminates the flame reaction and forms preheated reactant gas in said elongated preheating zone and cooled product gases in said product cooling zone, and removing cooled product gases containing hydrogen cyanide from said product cooling zone.

10. A process according to claim 9 wherein said hydrocarbon vapor comprises a normally gaseous hydrocarbon having from 1 to 4 carbon atoms per molecule.

References Cited in the file of this patent

UNITED STATES PATENTS

| Number | Name | Date |
|---|---|---|
| 1,558,897 | Lea et al. | Oct. 27, 1925 |
| 1,855,134 | Lheure | Apr. 19, 1932 |
| 1,957,749 | Andrussow et al. | May 8, 1934 |
| 1,967,051 | Buchanan et al. | July 17, 1934 |
| 1,972,937 | Jaeger | Sept. 11, 1934 |
| 2,008,761 | Jaeger | July 23, 1935 |
| 2,010,235 | Jaeger | Aug. 6, 1935 |
| 2,029,604 | Boyer et al. | Feb. 4, 1936 |
| 2,057,282 | Tramm et al. | Oct. 13, 1936 |
| 2,065,617 | Sheldon | Dec. 29, 1936 |
| 2,069,545 | Carlisle | Feb. 2, 1937 |
| 2,431,632 | Brandt | Nov. 25, 1947 |
| 2,529,598 | Deanesly | Nov. 14, 1950 |
| 2,576,228 | Kinnaird | Nov. 27, 1951 |
| 2,596,421 | McKinnis | May 13, 1952 |
| 2,620,259 | McKinnis | Dec. 2, 1952 |